United States Patent [19]

Yagi et al.

[11] 4,182,286
[45] Jan. 8, 1980

[54] TAPERED TORCH PASSAGE CONSTRUCTION FOR INTERNAL COMBUSTION

[75] Inventors: Shizuo Yagi, Asaki; Isao Fujii, Hasuda; Atsushi Tanaka, Matsudo, all of Japan

[73] Assignee: Honda Giken Kogyo Kabushiki Kaisha, Tokyo, Japan

[21] Appl. No.: 890,512

[22] Filed: Mar. 27, 1978

[30] Foreign Application Priority Data

Sep. 29, 1977 [JP] Japan .................... 52/116087

[51] Int. Cl.$^2$ ............................................. F02B 23/00
[52] U.S. Cl. ........................ 123/75 B; 123/191 S; 123/32 SP; 123/32 ST; 123/32 C
[58] Field of Search ......... 123/191 S, 191 SD, 32 ST, 123/32 SP, 32 K, 32 L, 32 C, 75 B

[56] References Cited

U.S. PATENT DOCUMENTS

| | | | |
|---|---|---|---|
| 2,380,615 | 7/1945 | Shepperd | 123/32 K |
| 2,804,858 | 9/1957 | Schillgen | 123/32 C |
| 3,832,984 | 9/1974 | Taguchi | 123/75 B |
| 3,853,097 | 10/1974 | Kume | 123/32 SP |
| 3,989,015 | 11/1976 | Rivere | 123/32 SP |
| 4,004,563 | 1/1977 | Nakamura | 123/32 K |
| 4,076,000 | 2/1978 | Takao | 123/191 S |
| 4,098,246 | 7/1978 | Noguchi | 123/191 S |
| 4,116,191 | 9/1978 | Yanugihara | 123/191 S |

FOREIGN PATENT DOCUMENTS

| | | | |
|---|---|---|---|
| 655262 | 12/1937 | Fed. Rep. of Germany | 123/32 SP |
| 2331560 | 1/1974 | Fed. Rep. of Germany | 123/191 S |

*Primary Examiner*—Ronald H. Lazarus
*Attorney, Agent, or Firm*—Lyon & Lyon

[57] ABSTRACT

An internal combustion piston engine has a main combustion chamber and an auxiliary combustion chamber connected by a torch passage, which is tapered end to end, the large end communicating with the main combustion chamber. Lean mixture is supplied to the main combustion chamber and rich mixture is supplied to the auxiliary combustion chamber. A spark plug ignites the mixture in the auxiliary combustion chamber, causing a torch flame to be projected through the tapered torch passage into the main combustion chamber near its center. A suction conduit, smaller in diameter and total area than any portion of the tapered torch passage, extends from a peripheral portion of the main chamber and intersects the tapered torch passage between its ends. Movement of the burning gases through the torch passage aspirates a flow of mixture from the main combustion chamber through the suction conduit into the torch passage.

2 Claims, 2 Drawing Figures

TAPERED TORCH PASSAGE CONSTRUCTION FOR INTERNAL COMBUSTION

The device of this invention is similar in many respects to the disclosure of the copending application of Yagi et al Ser. No. 890,514 entitled "Torch Passage Construction for Stratified Charge Engine" filed of even date herewith.

This invention relates to a four-cycle internal combustion piston engine and its object is to reduce CO and HC emissions as well as $NO_x$ emission in the exhaust of the engine, as well as to improve fuel consumption. These emission characteristics take place over the entire range of operation loads on the engine.

Engines of this type employ a first carburetor to supply a relatively lean air-fuel mixture to the main combustion chamber and a second carburetor to supply relatively rich air-fuel mixture to the auxiliary combustion chamber. A torch passage extends from the auxiliary combustion chamber to the main combustion chamber and has an outlet end positioned near the center of the main combustion chamber. A spark plug communicates with the auxiliary combustion chamber.

In accordance with this invention, a suction conduit intersects a tapered torch passage at a location between its ends and this suction conduit communicates with a peripheral portion of the main combustion chamber. At the end of the compression stroke of the piston a spark plug communicating with the auxiliary combustion chamber ignites the mixture therein and sends a burning mixture or torch flame through the tapered torch passage and into the main combustion chamber to ignite the relatively lean mixture therein. This flow through the tapered torch passage induces a flow of mixture from the main combustion chamber through the suction conduit and into the tapered torch passage. The combustion in the main chamber is improved for all loading conditions of the engine, from idling to full load, and this results in improvement of HC and $NO_x$ emissions.

Other objects and advantages will appear hereinafter.

Figure 1:
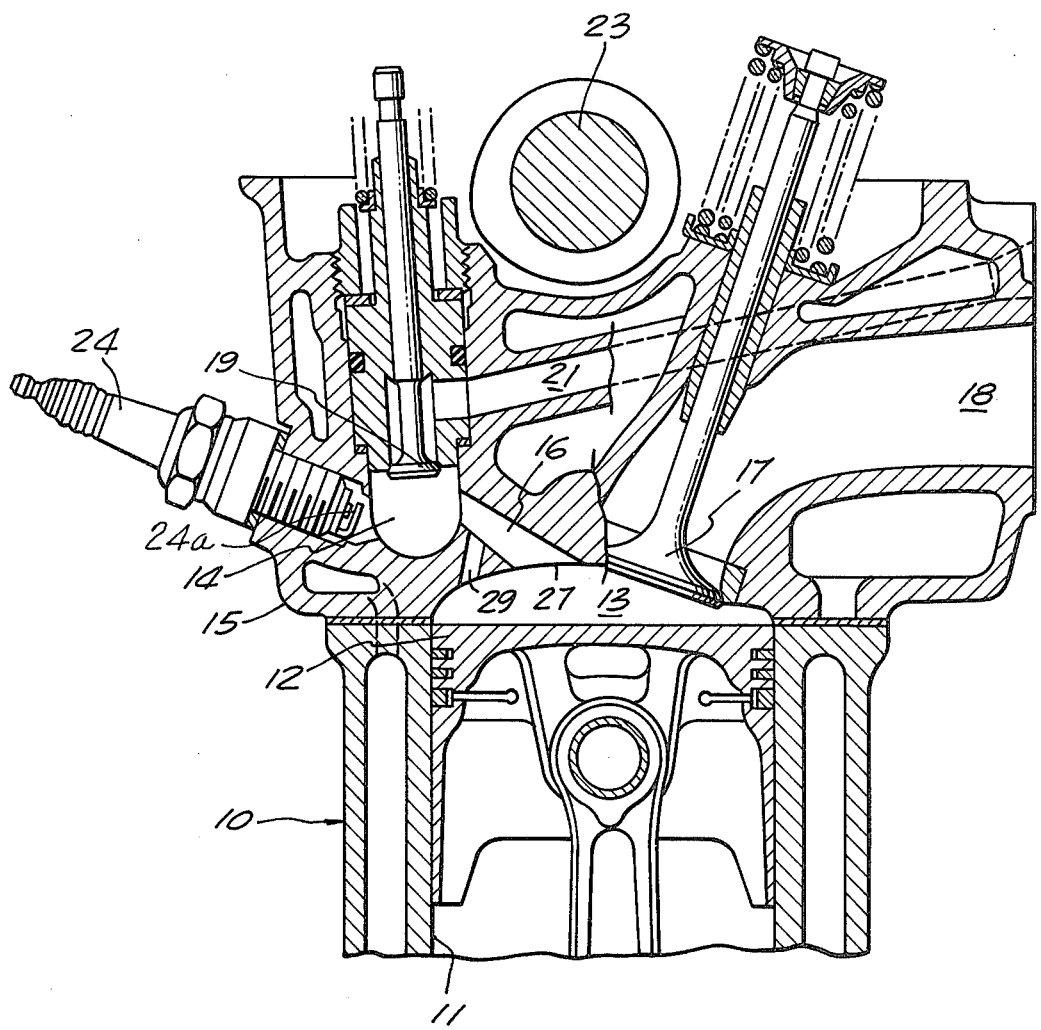
FIG. 1 is a sectional elevation partly broken away showing a preferred embodiment of this invention.
Figure 2:
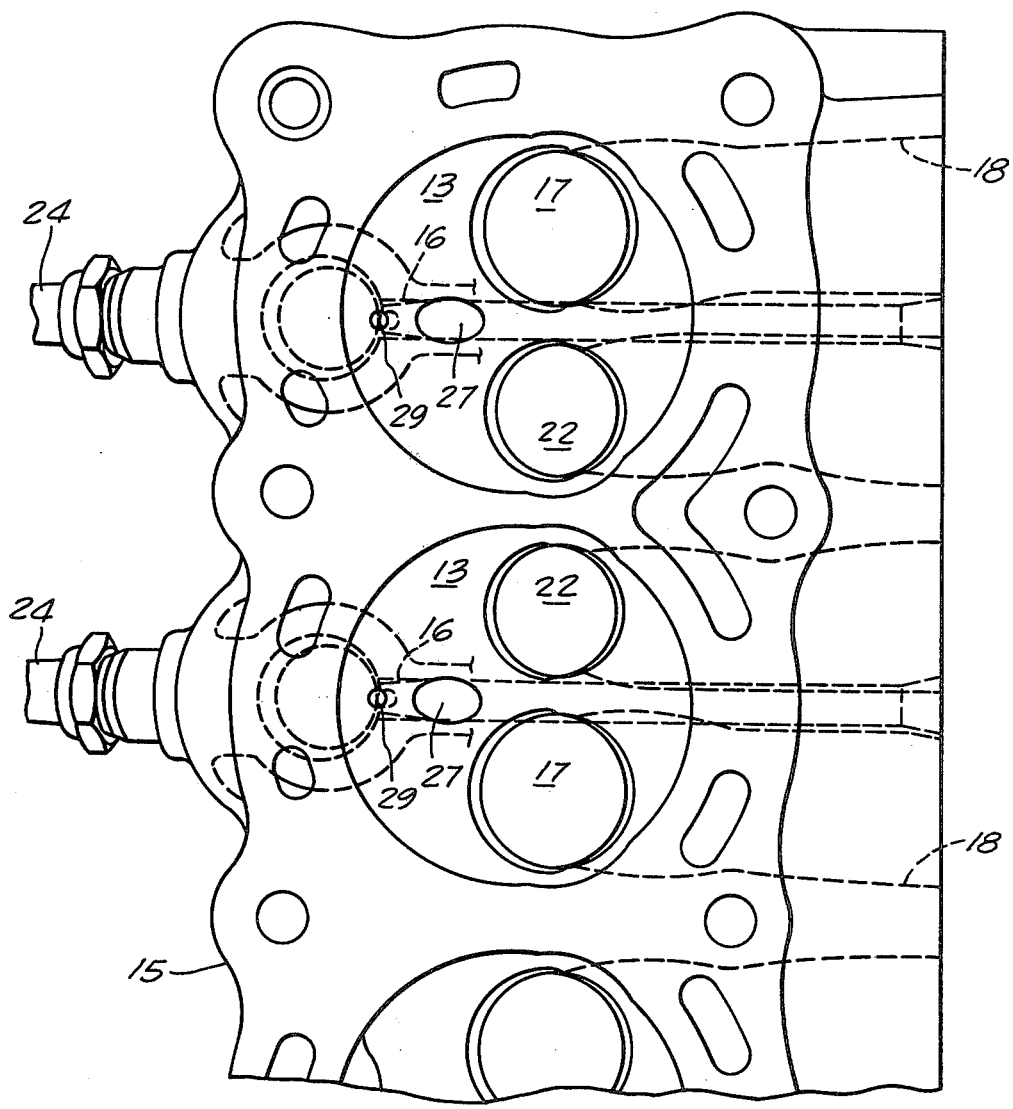
FIG. 2 is a view of the underside of the cylinder head of the engine, partly broken away, and showing the combustion chambers.

Referring to the drawings, the internal combustion engine generally designated 10 is provided with a cylinder 11 and a piston 12, the latter forming one wall of the main combustion chamber 13. An auxiliary combustion chamber 14 is mounted in the engine head 15 and is connected to the main combustion chamber 13 by means of the torch passage 16 in the engine head 15. A main intake valve 17 controls the flow of relatively lean mixtures from a first carburetor, not shown, which supplies the main intake passage 18. An auxiliary intake valve 19 controls the relatively rich mixture supplied by a second carburetor, not shown, through the auxiliary intake passage 21. An exhaust valve 22 (see FIG. 2) is also provided for the main combustion chamber 13. All three valves 17, 19 and 22 are operated from the cam shaft 23 by means of conventional mechanism, not shown. A spark plug 24 communicates with the auxiliary combustion chamber 14. The torch passage 16 is positioned in a location remote from the electrodes 24a of the spark plug 24.

The torch passage 16 is tapered end to end, the small end communicating with the auxiliary combustion chamber and the large end 27 communicating with the main combustion chamber 13 near the center thereof. A suction conduit 29 intersects the tapered torch passage 16 near its small end. The axes of the torch passage 16 and suction conduit 29 lie in the same plane, which plane contains the axis of the piston 12. All portions of the tapered torch passage 16 are larger in diameter than the suction conduit 29. More than one suction conduit can be employed, if desired.

The angle between the axis of the torch passage 16 and the axis of the suction conduit 29 is such as to produce the aspiration effect; ordinarily the angle may lie in the range of 50° to 80°. The end of the suction conduit communicating with the main combustion chamber 13 is located in the outer periphery of that chamber, that is, the space lying outside a circle having one-half the diameter of the main combustion chamber 13 and concentric therewith.

In operation, a relatively lean air-fuel mixture is drawn into the main combustion chamber 13 from the main intake passage 18 during the intake stroke of the piston 12. At the same time relatively rich air-fuel mixture is drawn into the auxiliary combustion chamber 14 from the auxiliary intake passage 21. At the end of the compression stroke of the piston the spark plug 24 ignites the mixture in the auxiliary combustion chamber 14, causing a flame of burning mixture to pass from the auxiliary chamber 14 through the torch passage 16 and into the main combustion chamber 13 to burn the lean mixture therein.

Movement of the burning gases through the torch passage 16 causes a flow of mixture from the main combustion chamber 13 to pass through the suction conduit 29 and into the torch passage 16 by aspiration. This movement of lean mixture from the peripheral portion of the main combustion chamber 13 through the suction conduit 29 has been found to cause a double burning sequence which produces a marked improvement in emissions of CO, HC and $NO_x$. Color photographs taken through a transparent window of a test engine show that burning is first initiated in the main combustion chamber 13 near the outlet 27 of the torch passage 16. Combustion then spreads from the center of the main combustion chamber 13 toward the periphery thereof.

A second burning sequence of the same nature follows very shortly thereafter. Induction of the unburned mixture through the suction conduit 29 from the outer periphery of the main combustion chamber 13 is an important feature of this invention. This unburned mixture is not initially reached by the flame from the torch passage 16 and threfore aspiration of this unburned mixture through the suction conduit 29, aided by pressure increase in the main combustion chamber 13, results in improved combustion in the outer periphery of the main combustion chamber 13. This in turn reduces CO, HC and $NO_x$ emissions in the exhaust gases. The overall air-fuel ratio is on the lean side of the stoichiometric ratio and therefore good fuel economy is achieved.

Having fully described our invention, it is to be understood that we are not to be limited to the details herein set forth but that our invention is of the full scope of the appended claims.

We claim:

1. In an internal combustion piston engine, the combination of: walls forming a main combustion chamber, a piston forming one wall of said chamber, means forming an auxiliary combustion chamber, a spark plug having electrodes communicating with said auxiliary combustion chamber, means including a main intake valve for supplying a relatively lean air-fuel mixture to said main combustion chamber, means including an auxiliary intake valve for supplying a relatively rich air-fuel mixture to said auxiliary combustion chamber, a tapered torch passage having a small end communicating with said auxiliary combustion chamber and having a large outlet end positioned near the center of said main combustion chamber, said tapered torch passage being positioned at a location remote from said spark plug electrodes, and a suction conduit intersecting said tapered torch passage at a location between its end and extending to a peripheral zone of said main combustion chamber, the cross section area of said tapered torch passage being greater at all locations than that of said suction conduit, whereby movement of burning air-fuel mixture through said torch passage aspirates a flow of air-fuel mixture from said main combustion chamber through said suction conduit and into said torch passage.

2. The combination set forth in claim 1 in which said tapered torch passage is longer than said suction conduit.

* * * * *

UNITED STATES PATENT AND TRADEMARK OFFICE
CERTIFICATE OF CORRECTION

PATENT NO. : 4,182,286
DATED : January 8, 1980
INVENTOR(S) : Shizuo Yagi et al

It is certified that error appears in the above-identified patent and that said Letters Patent are hereby corrected as shown below:

The word --ENGINE-- should be inserted at end of the title on the front page and also at top of Column 1.

Column 4, line 3, "end" should read --ends--.

Signed and Sealed this

Fifteenth Day of April 1980

[SEAL]

Attest:

Attesting Officer

SIDNEY A. DIAMOND

Commissioner of Patents and Trademarks